United States Patent
Baldwin et al.

(10) Patent No.: US 10,311,138 B2
(45) Date of Patent: Jun. 4, 2019

(54) PREVENTING PARTIAL CHANGE SET DEPLOYMENTS IN CONTENT MANAGEMENT SYSTEMS

(71) Applicant: International Business Machines Corporation, Armonk, NY (US)

(72) Inventors: Nicholas A. Baldwin, Gladesville (AU); Mark C. Hampton, Carlton (AU); Stefan A. Hepper, San Jose, CA (US); Eric Martinez de Morentin, Manly (AI)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 14/317,014

(22) Filed: Jun. 27, 2014

(65) Prior Publication Data

US 2015/0186428 A1    Jul. 2, 2015

Related U.S. Application Data

(63) Continuation of application No. 14/144,731, filed on Dec. 31, 2013.

(51) Int. Cl.
*G06F 17/00* (2019.01)
*G06F 17/22* (2006.01)
(Continued)

(52) U.S. Cl.
CPC .......... *G06F 17/2288* (2013.01); *G06F 16/21* (2019.01); *G06F 16/27* (2019.01); *G06F 16/93* (2019.01); *G06Q 10/10* (2013.01)

(58) Field of Classification Search
CPC ............... G06F 17/30011; G06F 17/30; G06F 17/2288; G06F 17/30289; G06F 17/30575; G06F 16/27; G06F 16/21
See application file for complete search history.

(56) References Cited

U.S. PATENT DOCUMENTS 6,311,194 B1 * 10/2001 Sheth ................ G06F 17/30595
                                                    707/E17.095
7,496,637 B2    2/2009 Han et al.
(Continued)

FOREIGN PATENT DOCUMENTS

| CN | 102024005 A | 4/2011 |
| CN | 102801759 A | 11/2012 |
| CN | 104750772 A | 7/2015 |

OTHER PUBLICATIONS

Anonymous, "Method and System for Dynamic and Real-time Content Syndication via RSS", IP.com, IP.com Electronic Publication: May 12, 2010, IP.com No. IPCOM000195710D; [website: http://ip.com/IPCOM/000195710].

(Continued)

*Primary Examiner* — Stephen S Hong
*Assistant Examiner* — Marshon L Robinson
(74) *Attorney, Agent, or Firm* — Edward J. Wixted, III (57) ABSTRACT

Embodiments of the present invention relate to preventing partial change set deployments in content management systems. One or more computer processors determine a content item to retrieve from a repository. The one or more computer processors retrieve the determined content item from the repository. The one or more computer processors add the retrieved content item to a project having a project state. The one or more computer processors determine the project state. The one or more computer processors publish the project.

11 Claims, 5 Drawing Sheets

(51) Int. Cl.
*G06F 16/21* (2019.01)
*G06F 16/27* (2019.01)
*G06Q 10/10* (2012.01)
*G06F 16/93* (2019.01)

(56) References Cited

U.S. PATENT DOCUMENTS

| | | | |
|---|---|---|---|
| 7,657,887 B2 | 2/2010 | Kothandaraman et al. | |
| 8,161,099 B2 | 4/2012 | Stich et al. | |
| 8,200,700 B2 | 6/2012 | Moore et al. | |
| 8,200,775 B2 | 6/2012 | Moore | |
| 2002/0143819 A1 | 10/2002 | Han et al. | |
| 2003/0142128 A1* | 7/2003 | Reulein | G06F 17/30011 715/742 |
| 2003/0144982 A1 | 7/2003 | Reulein et al. | |
| 2004/0019846 A1 | 1/2004 | Castellani et al. | |
| 2004/0205656 A1 | 10/2004 | Reulein et al. | |
| 2005/0257158 A1 | 11/2005 | Lombardo | |
| 2006/0173985 A1* | 8/2006 | Moore | G06F 17/3089 709/223 |
| 2006/0265398 A1 | 11/2006 | Kaufman | |
| 2007/0112788 A1 | 5/2007 | Kobza et al. | |
| 2007/0198943 A1 | 8/2007 | Grason et al. | |
| 2007/0220089 A1 | 9/2007 | Aegerter | |
| 2009/0055419 A1 | 2/2009 | Gibbon et al. | |
| 2009/0070426 A1* | 3/2009 | McCauley | G06Q 10/10 709/205 |
| 2010/0153453 A1 | 6/2010 | Knowles | |
| 2011/0093353 A1 | 4/2011 | Nutter et al. | |
| 2011/0137900 A1 | 6/2011 | Chang et al. | |
| 2012/0110515 A1 | 5/2012 | Abramoff et al. | |
| 2012/0284290 A1 | 11/2012 | Keebler et al. | |
| 2013/0054688 A1 | 2/2013 | Rourke et al. | |
| 2014/0006930 A1 | 1/2014 | Hollis et al. | |
| 2015/0026825 A1 | 1/2015 | Dube et al. | |

OTHER PUBLICATIONS

IBM, "IBM Web Content Manager", Third Edition, Published Apr. 2011; [website: http://infolib.lotus.com/resources/portal/7.0.0/doc/en_us/pt700abd004/ht . . . ].

U.S. Appl. No. 14/144,731 entitled "Preventing Partial Change Set Deployments in Content Mangement Systems" filed Dec. 31, 2013.

* cited by examiner

PREVENTING PARTIAL CHANGE SET DEPLOYMENTS IN CONTENT MANAGEMENT SYSTEMS

BACKGROUND

The present disclosure relates generally to the field of content management, and more particularly to preventing partial change set deployments in content management systems.

A content management (hereinafter "CM") system is software that allows publishing, editing, and modifying content, such as web pages, electronic documents, and electronic media, as well as maintenance from a central interface. A CM system can separate content development, authoring, staging, and production environments. With this separation comes the requirement to support transmitting data between these environments. Syndication is a method by which data is replicated from one content library to another, which may reside on another server. Syndicating changes between remote systems introduce many complex data management issues. Syndicating published changes between systems is a complicated task as all system events are being sent to downstream environments where these changes will be re-played.

Typically, changes on the subscriber are applied immediately and errors are tracked and reported back on the syndicator. When errors occur during transport, deployment, or integration phases of the syndication cycle these errors can break portions of the production website, which may remain broken until content items are retried and re-syndicated. Additionally, it may be difficult to rollback the entire syndication cycle as changes are committed upon receipt.

SUMMARY

Embodiments of the present invention relate to preventing partial change set deployments in content management systems. One or more computer processors determine a content item to retrieve from a repository. The one or more computer processors retrieve the determined content item from the repository. The one or more computer processors add the retrieved content item to a project having a project state. The one or more computer processors determine the project state. The one or more computer processors publish the project.

DETAILED DESCRIPTION

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (hereinafter "RAM"), a read-only memory (hereinafter "ROM"), an erasable programmable read-only memory (hereinafter "EPROM" or "Flash memory"), an optical fiber, a portable compact disc read-only memory (hereinafter "CD-ROM"), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object-oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (hereinafter "LAN") or a wide area network (hereinafter "WAN"), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

A content management (hereinafter "CM") system is software that allows publishing, editing, and modifying content, such as web pages, electronic documents, and electronic media, as well as maintenance from a central interface. A CM system can separate development, authoring, staging, and production environments. With this separation comes the requirement to support transmitting data between these environments. Syndication is the method by which data is replicated from one content library to another, which may reside on another server. Syndicating changes between remote systems introduces many complex data management issues. Syndicating published changes between systems is a complicated task as all system events are being sent to downstream environments where these changes will be re-played.

Syndication requires a syndicator and a subscriber. Syndicators are computing devices that indicate which content libraries are to be replicated to subscribers, which are computing devices that receive the data replicated from the libraries specified by the syndicator. In certain embodiments, a computing device can be both a syndicator and subscriber. Embodiments of the present invention seek to control deployment of syndicated content changes using a single data object (hereinafter "project"), wherein all published changes are deployed as drafts on the subscriber. In response to deploying published changes on the system and verifying that the relationships between syndicated content items are in the correct state, the project is published on the subscriber.

In other embodiments, multiple syndication projects are prevented from being published concurrently to avoid potential data clashes caused by competing projects that may result in errors and a broken website. In still other embodiments, if errors do occur with a project, the project is left on the subscriber in an unpublished state so that the problem can be diagnosed and instead of needing to redeploy all changes, only the missing data need be requested from the syndicator and incorporated in to the erroneous project; hence, the subscriber system is not impacted. Alternatively, the project can be deleted and all changes included in the syndication are rolled back.

Figure 1:
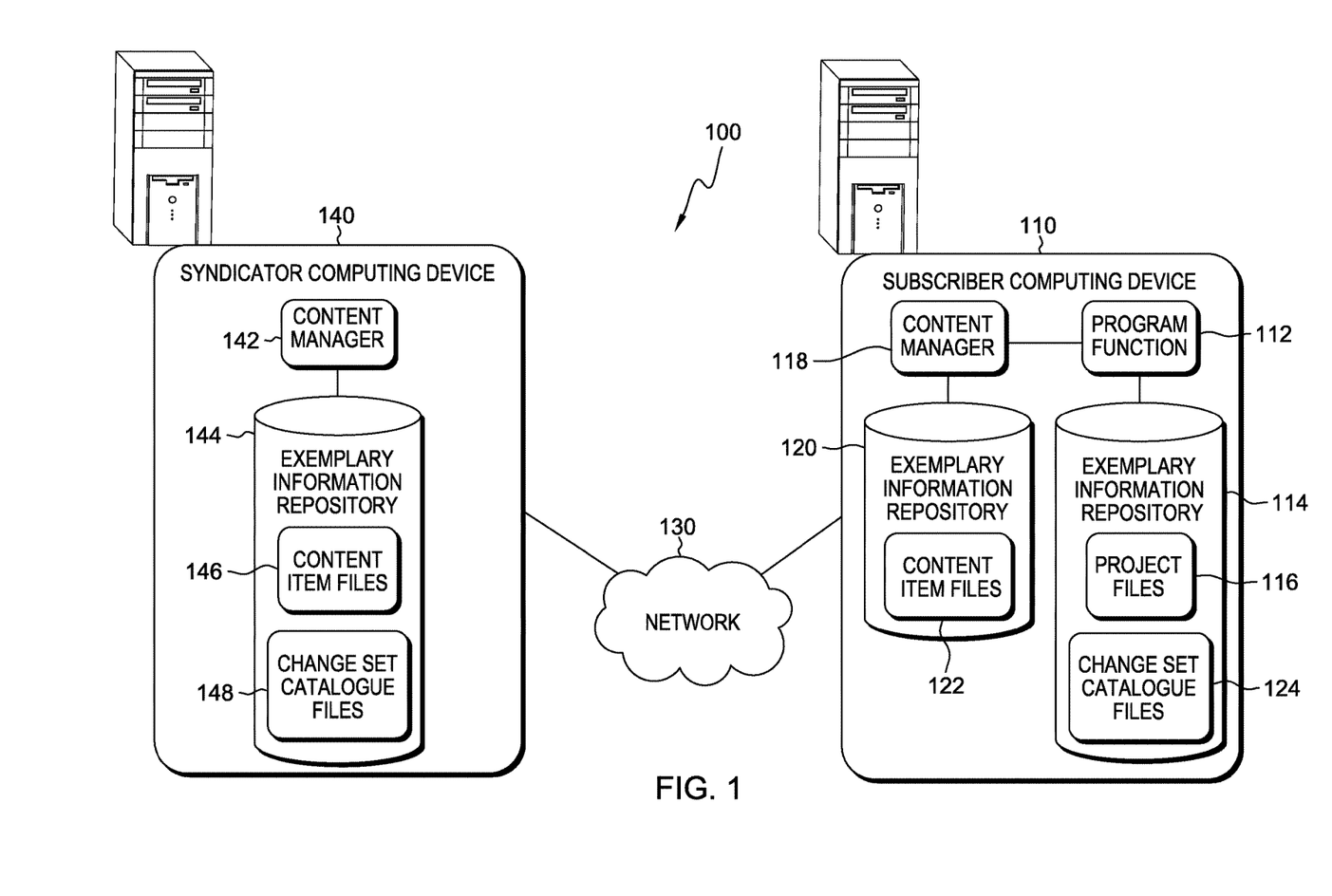
FIG. 1 is a block diagram illustrating an environment, in accordance with an embodiment of the present invention.

Embodiments of the present invention will now be described in detail with reference to the Figures. FIG. 1 is a block diagram illustrating an environment, generally designated 100, in accordance with one embodiment of the present invention.

Environment 100 includes syndicator computing device 140 and subscriber computing device 110, all interconnected over network 130. Network 130 can be, for example, a local area network (hereinafter "LAN"), a wide area network (hereinafter "WAN"), such as the Internet, or a combination of the two, and can include wired, wireless, or fiber optic connections. In general, network 130 can be any combination of connections and protocols that will support communications between syndicator computing device 140 and subscriber computing device 110, in accordance with an embodiment of the present invention.

In various embodiments of the present invention, syndicator computing device 140 and subscriber computing device 110 may be a laptop computer, a tablet computer, a netbook computer, a personal computer (hereinafter "PC"), a desktop computer, a personal digital assistant (hereinafter "PDA"), a smart phone, or any programmable electronic device capable of communicating via network 130. Syndicator computing device 140 is a computing device that can syndicate content items to subscribers, in accordance with an embodiment of the present invention. Syndicator computing device 140 includes content manager 142 and exemplary information repository 144.

Exemplary information repository 144, which is in communication with content manager 142, is an information store that includes content item files 146. Content items include documents, media, web pages, and templates. In certain embodiments, content items included in content item files 146 can have external dependencies on other content items that may or may not exist in content item files 122 (discussed below). Exemplary information repository 144 also includes change set catalogue files 148, which include current content item changes associated with subscriber computing device 110. In an embodiment, exemplary information repository 144 is external to syndicator computing device 140 and communicates therewith via network 130. Content manager 142 is software that facilitates the creation, management, storage, and/or deployment of web content, in accordance with an embodiment of the present invention. In an embodiment, content manager 142 syndicates content items to content manager 118, in accordance with an embodiment of the present invention.

Subscriber computing device 110 is a computing device that receives data replicated from repositories specified by syndicators, in accordance with an embodiment of the present invention. Subscriber computing device 110 includes content manager 118, program function 112, exemplary information repository 120, and exemplary information repository 114. Exemplary information repository 120 includes content item files 122. Content item files 122 may include content items subscribed from a syndicator, such as syndicator computing device 140. Content item files 122 may include content items that are in production.

Content manager 118 is in communication with exemplary information repository 120 and program function 112. Content manager 118 is software that facilitates the creation, management, storage, and/or deployment of web content, in accordance with an embodiment of the present invention. In an embodiment, content manager 118 produces content items, such as content item files 122. Content manager 118 subscribes content from content managers, such as content manager 142. Exemplary information repository 114 includes project files 116. In an embodiment, exemplary information repository 120 is external to subscriber computing device 110 and communicates therewith via network 130.

Project files 116 are data objects that temporarily store syndicated content items that are to be published by content manager 118, in accordance with an embodiment of the present invention. Briefly, project files 116 can be used to isolate a set content item modifications (hereinafter "change set") syndicated from a remote system, such as syndicator computing device 140. Hence, if errors occur during the transport, deployment, or integration phases of the syndication cycle (discussed further below), their impact on the live data of subscriber can be reduced in addition to their ability to propagate beyond subscriber computing device 110.

Program function 112 is in communication with content manager 118 and exemplary information repository 114, in accordance with an embodiment of the present invention. Program function 112 can transmit instructions to content manager 118 for servicing. Program function 112 can process information included in change set catalogue files 148. Program function 112 can isolate syndicated content, such as content syndicated by content manager 142 via network 130. Program function 112 can validate the state of projects included in project files 116. Program function 112 may either instruct content manager 112 to apply modifications to content items or program function 112 can apply the modifications to the content items. Program function 112 may require user prior to approval for content item publications by content manager 118. Program function 112 can instruct content manager 118 to publish change sets included in project files 116.

Figure 2:
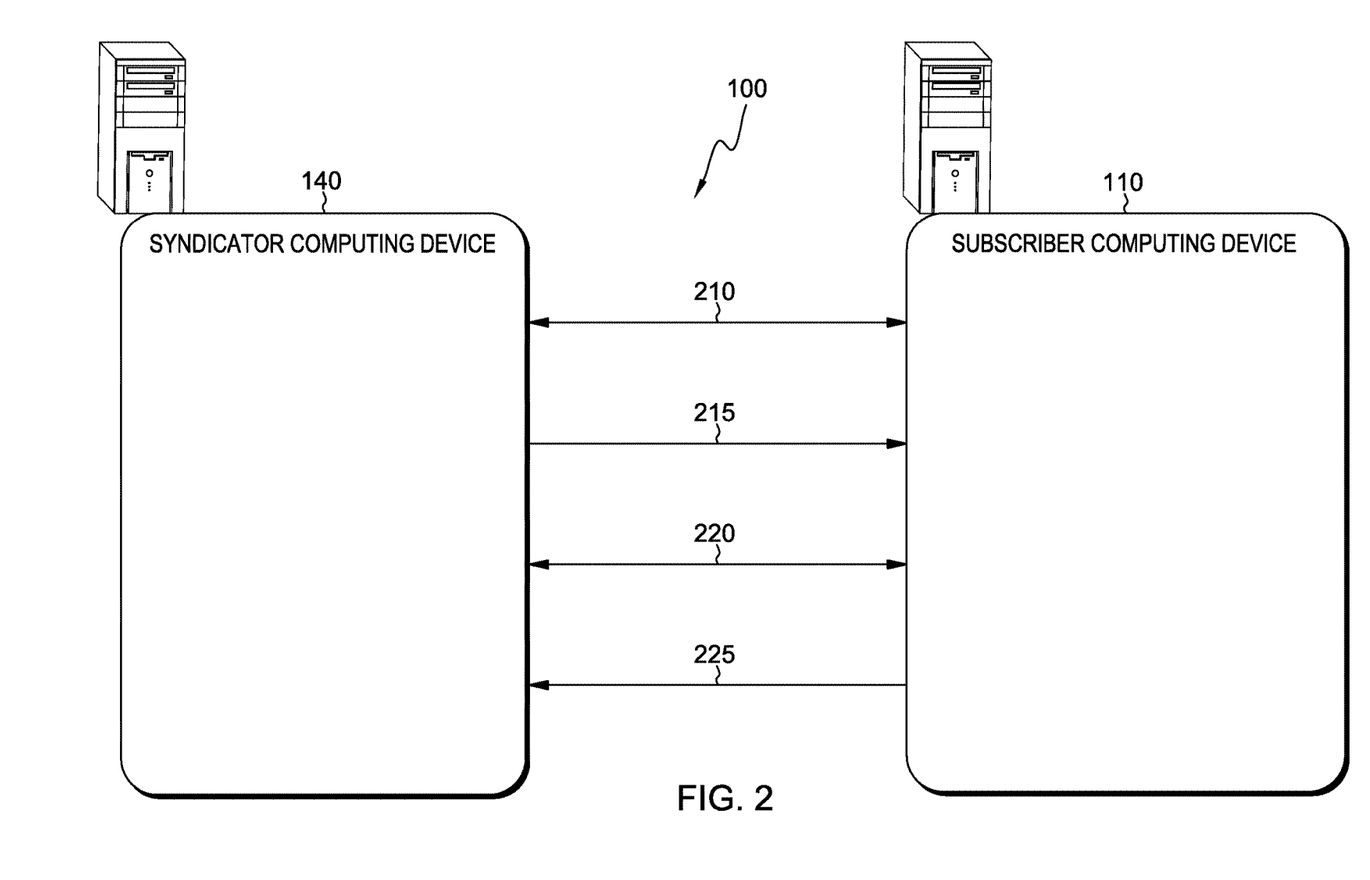
FIG. 2 is an exemplary depiction of a syndication cycle, in accordance with an embodiment of the present invention.
Figure 3:
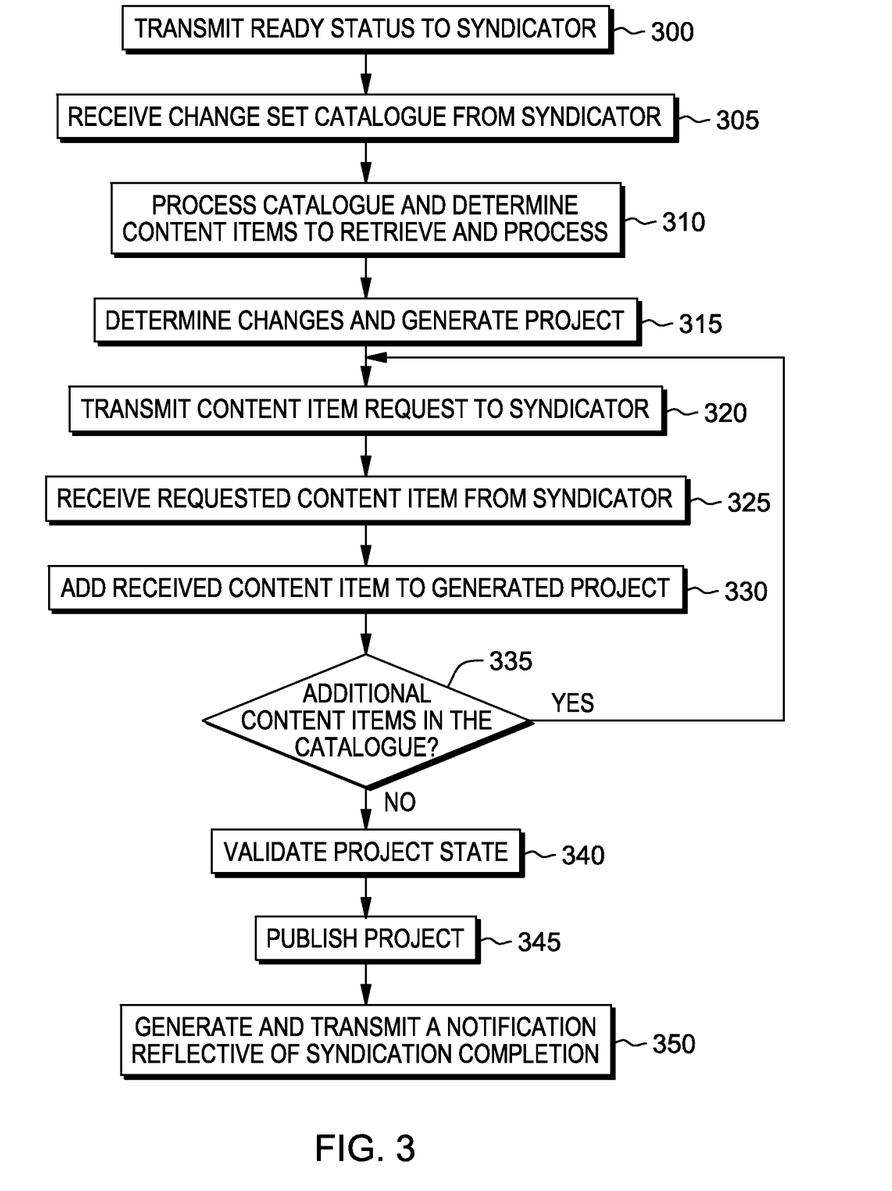
FIG. 3 illustrates a flowchart depicting operational steps of a program function, in accordance with an embodiment of the present invention.

Concepts discussed in reference to FIG. 2 will be used to support the discussion of FIG. 3. FIG. 2 is an exemplary depiction of a syndication cycle, in accordance with an embodiment of the present invention. Specifically, syndication cycle 200 reflects the updating of a website hosted by content manager 142, for example, a website portal that functions as a point of access to information, such as information included in content item files 122. Syndication cycle 200 includes call response cycle 220 as well as transmissions 210, 215 and 225 between syndicator computing device 140 and subscriber computing device 110.

Transmission 210 initiates when program function 112 instructs content manager 118 to notify content manager 142, via network 130, that content manager 118 is available to receive syndicated content. In response, content manager 142 can determine the changes associated with the website portal and generate an associated change set catalogue that includes the determined changes. Transmission 215 involves content manager 142 transmitting the generated change set to content manager 118, via network 130. Program function 112 stores the transmitted change set catalogue in change set catalogue files 124. Program function 112 processes the change set catalogue and determines which content items that are included in content item files 146 to instruct content manager 118 to request from content manager 142.

In response to determining which content items to request, program function 112 generates a project within project files 116 that is associated with the request. Call/response cycle 220, which executes for each determined content item, initiates when content manager 118 transmits, via network 130, a content item request for a determined content item and concludes when content manager 142 replicates the requested content item to content manager 118, via network 130. In certain embodiments, program function 112 provides a manual approval step. For example, a user, such as a content owner, can be allowed to validate that the changes included in the project have been implemented correctly. In other embodiments, program function 112 allows a user, such as a content owner, to preview the project prior to publication.

In an embodiment, subsequent to receiving a requested content item, program function 112 can add the content items to project files 116 by determining whether the requested content item is a draft. If the content item is a draft, then project function 112 instructs content manager 118 to store the draft in content item files 122 as is (i.e. without modifications). If the content item is not a draft, program function 112 determines whether the received content item is an update to an existing published content item included in content item files 122. If the received content item is new, then program function 112 changes the state of the received content item to draft and adds it to the appropriate project included in project files 116.

If the received content item is not new (i.e. it is published content), then program function 112 creates a draft from the associated published content item and updates the draft with the syndicated content item. In addition, program function 112 adds the draft to the appropriate project included in project files 116. In response to adding all content items associated with the request, program function 112 validates the state of the project and instructs content manager 118 to publish the validated project and transmit notification of the completion of the syndication cycle to content manager 142 (transmission 225), via network 130.

Figure 4:
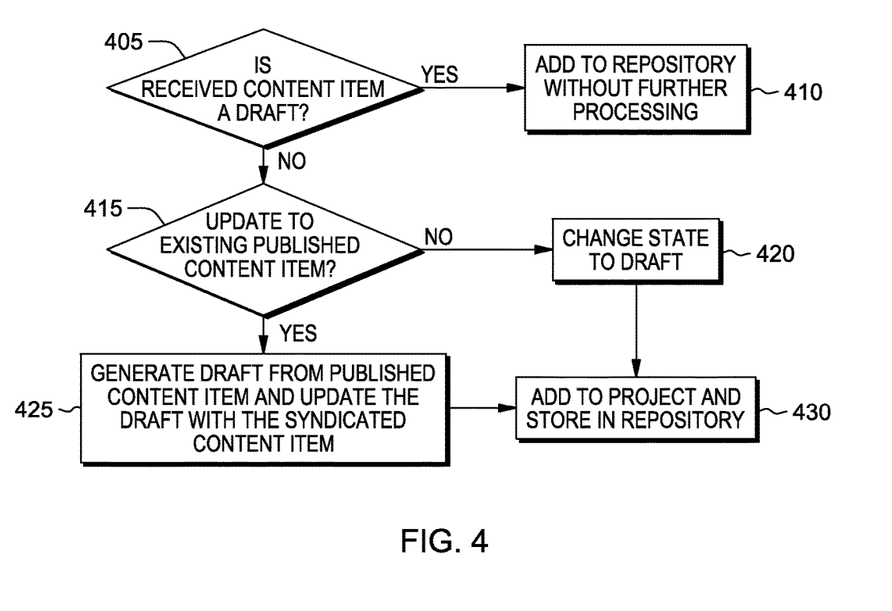
FIG. 4 illustrates a flowchart depicting additional operational steps of a program function, in accordance with an embodiment of the present invention.

FIG. 3 illustrates a flowchart depicting operational steps of program function 112, in accordance with an embodiment of the present invention. Program function 112 transmits "ready" status to syndicator (step 300). Program function 112 receives change set catalogue from syndicator (step 305). Program function 112 processes the change set catalogue and determines which content items to retrieve and process (step 310). Program function 112 determines the changes and generates a project (step 315). Program function 112 transmits content item request to syndicator (step 320). Program function 112 receives requested content items from syndicator (step 325). Program function 112 adds the received content items to the appropriate project (step 330). Content items may be added to projects in various ways, an exemplary method is depicted in FIG. 4 below. If program function 112 determines that there are additional content items in the catalogue ("yes" branch decisional 335), then program function 112 returns to step 320. If program function 112 determines that there are not additional content items in the catalogue ("no" branch decisional 335), then program function 112 validates the project state (step 340). Program function 112 publishes the validated project (step 345). Program function 112 transmits a notification reflective of the completion of the syndication cycle to the syndicator (step 350).

FIG. 4 illustrates a flowchart depicting additional operational steps of program function 112, in accordance with an embodiment of the present invention. Specifically, FIG. 4 depicts an exemplary method to add syndicated content to projects. Program function 112 determines whether the received content item is a draft (step 405). If program function 112 determines that the received content item is a draft ("yes" branch decisional 405), then program function 112 adds the received content item to the repository without further processing (step 410). If program function 112 determines that the received content item is NOT a draft ("NO" branch decisional 405), then program function 112 determines whether the received content item is an update to an existing published content item (decisional 415).

If program function 112 determines that the received content item is not an update to an existing published content item ("no" branch decisional 415), then program function 112 changes the state of the received content item to draft (step 420) and, subsequently, adds the received content item to the project and stores the received content item in the repository (step 430). If program function 112 determines that the received content item is an update to an existing published content item ("yes" branch decisional 415), then program function 112 generates a draft of the published content item and updates the draft with the syndicated content item (step 425) and proceeds to step 430.

Figure 5:
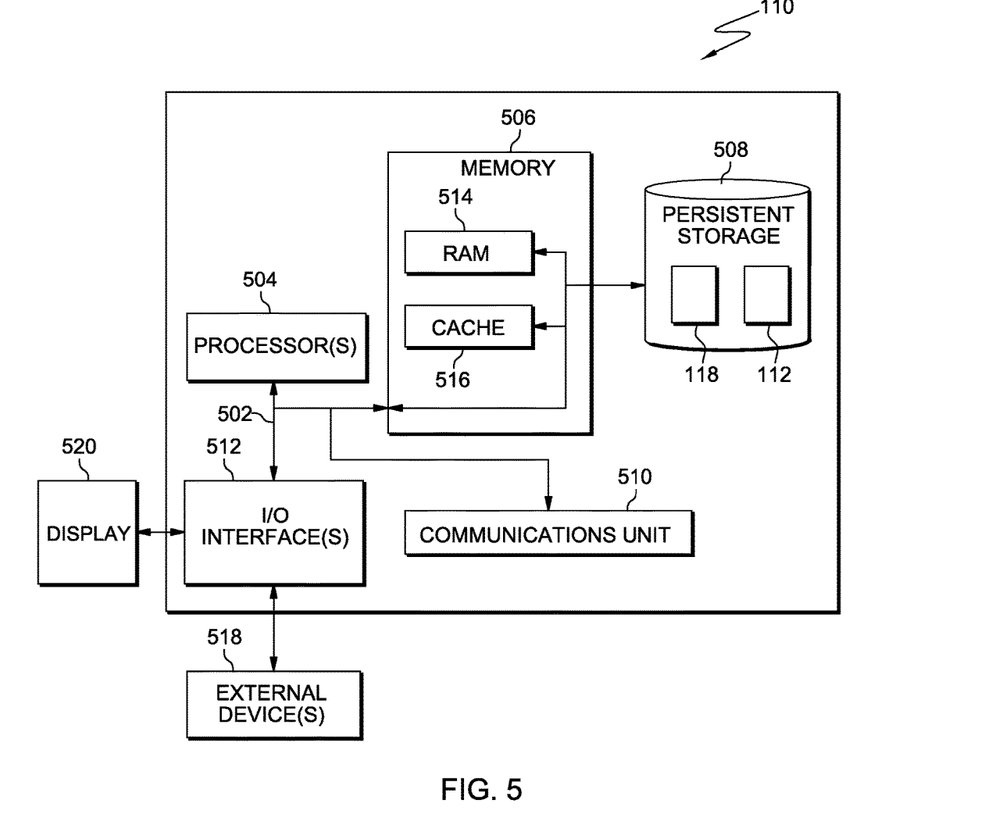
FIG. 5 depicts a block diagram of components of a subscriber computing device, in accordance with an embodiment of the present invention.

FIG. 5 depicts a block diagram of components of subscriber computing device 110 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

A non-transitory computer-readable storage medium embodiment herein is readable by a computerized device. The non-transitory computer-readable storage medium stores instructions executable by the computerized device to perform a method that tests integrated circuit devices to measure a voltage overshoot condition.

Subscriber computing device 110 includes communications fabric 502, which provides communications between computer processor(s) 504, memory 506, persistent storage 508, communications unit 510, and input/output (hereinafter "I/O") interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Program function 112, content manager 118, and exemplary information repositories 120 and 114 are stored in persistent storage 508 for execution and/or access by one or more of the respective computer processor(s) 504 via one or more memories of memory 506. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (hereinafter "ROM"), an erasable programmable read-only memory (hereinafter "EPROM"), a flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of syndicator computing device 140 and network 130. In these examples, communications unit 510 includes one or more network interface cards. Communications unit 510 may provide communications through the use of either or both physical and wireless communications links. Program function 112 and content manager 118 may be downloaded to persistent storage 508 through communications unit 510.

I/O interface(s) 512 allows for input and output of data with other devices that may be connected to subscriber computing device 110. For example, I/O interface(s) 512 may provide a connection to external devices 518 such as a keyboard, a keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., program function 112 and content manager 118, can be stored on such portable computer-readable storage media and can be loaded onto persistent storage 508 via I/O interface(s) 512. I/O interface(s) 512 also connects to a display 520. Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
    sending, by one or more computer processors, a request to a syndicator, wherein the syndicator is an external computing device accessible by a network;
    responsive to the request, receiving, by the one or more computer processors, a change set catalogue from the syndicator, wherein the change set catalogue comprises an identification of a content item for a website that has been changed;

retrieving, by the one or more computer processors, the content item from a repository of the syndicator based on the change set catalogue;

adding, by the one or more computer processors, the retrieved content item to a project, wherein the project is a data object that temporarily stores the content item that has been changed and temporarily isolates the content item that has been changed from the website; and publishing, by the one or more computer processors, the project on the website.

2. The method of claim 1, wherein the one or more computer processors are included in a computing device that subscribes data from the syndicator, wherein the syndicator has one or more computer processors.

3. The method of claim 2, further comprising:

determining, by the one or more computer processors, that the retrieved content item includes a modification to a previously published content item retrieved by the computing device that subscribes data from the syndicator;

generating, by the one or more computer processors, a content item draft of the previously published content item;

applying, by the one or more computer processors, the modification to the content item draft; and adding the content item draft to the project.

4. The method of claim 1, wherein the step of publishing, by the one or more computer processors, the project requires prior user approval.

5. The method of claim 1, wherein the step of publishing, by the one or more computer processors, the project further comprises:

publishing, by the one or more computer processors, the project when a determined state of all retrieved content items reflect that all retrieved content items included in the project are ready for publishing, by the one or more computer processors.

6. The method of claim 1, further comprising:

receiving, by the one or more computer processors, validation that the content item has been correctly implemented; and wherein publishing the project comprises, responsive to receiving validation that the content item has been correctly implemented, publishing, by the one or more computer processors, the project.

7. The method of claim 1, further comprising:

requesting, by the one or more computer processors, to update syndicated content from the syndicator.

8. The method of claim 2, further comprising:

prior to publishing the project:

identifying, by the one or more computer processors, an error with the project;

responsive to identifying the error with the project, requesting, by the one or more computer processors, missing data from the syndicator, wherein the missing data is a subset of the content item; and incorporating, by the one or more computer processors, the missing data into the project.

9. The method of claim 1, wherein the project is a first project, further comprising:

preventing, by the one or more computer processors, a second project from publishing concurrently with the first project.

10. The method of claim 1, wherein publishing the project comprises updating, by the one or more computer processors, the website.

11. The method of claim 1, further comprising:

determining, by the one or more processors, the content item of the change set catalogue to retrieve.

* * * * *